United States Patent
Iwasaki

(10) Patent No.: US 10,262,064 B2
(45) Date of Patent: Apr. 16, 2019

(54) INFORMATION PROCESSING APPARATUS, INFORMATION PROCESSING METHOD, INFORMATION PROCESSING PROGRAM, RECORDING MEDIUM HAVING STORED THEREIN INFORMATION PROCESSING PROGRAM

(75) Inventor: Narutaka Iwasaki, Shinagawa-ku (JP)

(73) Assignee: Rakuten, Inc., Setagaya-Ku, Tokyo (JP)

(*) Notice: Subject to any disclaimer, the term of this patent is extended or adjusted under 35 U.S.C. 154(b) by 0 days.

(21) Appl. No.: 14/235,166

(22) PCT Filed: Feb. 24, 2012

(86) PCT No.: PCT/JP2012/054561
§ 371 (c)(1),
(2), (4) Date: Jan. 27, 2014

(87) PCT Pub. No.: WO2013/018387
PCT Pub. Date: Feb. 7, 2013

(65) Prior Publication Data
US 2014/0195509 A1  Jul. 10, 2014

(30) Foreign Application Priority Data
Jul. 29, 2011 (JP) ................................. 2011-167362

(51) Int. Cl.
*G06F 17/30* (2006.01)
(52) U.S. Cl.
CPC .............................. *G06F 17/30864* (2013.01)
(58) Field of Classification Search
CPC .............................................. G06F 17/30864
(Continued)

(56) References Cited

U.S. PATENT DOCUMENTS

2007/0005587 A1  1/2007 Johnson et al.
2010/0325100 A1  12/2010 Forstall et al.

FOREIGN PATENT DOCUMENTS

JP     2004-29943 A  *  1/2004  ............. G06F 17/30
JP     2004-029943 A     1/2004
(Continued)

OTHER PUBLICATIONS

John Marshall, et al., "GMarks: Add-ons for Firefox", Internet URL:https://adddons.mozilla.org/ja/firefox/addon/gmarks/, Mar. 29, 2011, 3 pages.

(Continued)

*Primary Examiner* — Joshua Bullock
(74) *Attorney, Agent, or Firm* — Sughrue Mion, PLLC

(57) ABSTRACT

Provided are an information processing apparatus, an information processing method, an information processing program, and a recording medium having stored therein the information processing program, which can efficiently present web pages related to a word input by a user while reducing the user's labor. A first keyword, which is used for the search of the information provided on a network, and location information of web pages, which is selected by a user among a plurality of web pages including the information searched by the first keyword, are registered in association with each other, and then, the location information of the web pages associated with the first keyword including a second keyword are presented to be selectable according to the input of the second keyword.

20 Claims, 7 Drawing Sheets

(58) Field of Classification Search
USPC .......................................................... 707/706
See application file for complete search history.

(56) References Cited

FOREIGN PATENT DOCUMENTS

JP          2007-034466 A      2/2007
JP          2010-140200 A      6/2010

OTHER PUBLICATIONS

Translation of Written Opinion of the International Search Authority dated Mar. 19, 2012 of PCT/JP2012/054561.
Bharat, Krishna, "SearchPad: explicit capture of search context to support Web search," Computer Networks 33 (2000) 493-501, Compaq Systems Research Center, Palo Alto, CA.
Parsons, Jeffrey et al., "Using Viewing Time to Infer User Preference in Recommender Systems," Memorial University of Newfoundland, St. John's, NL, Canada.
European Action dated Jan. 11, 2018 issued in application No. 12820640.6-1217, with revised summons dated Feb. 1, 2018; 10 pages.

* cited by examiner

FIG.3A

| USER INFORMATION DB 421 |
|---|
| USER ID |
| LOGIN ID |
| PASSWORD |
| NAME |
| ADDRESS |
| EMAIL ADDRESS |

FIG.3B

| USER INFORMATION DB 422 |
|---|
| USER ID |
| KEYWORD (FIRST KEYWORD) |
| URL OF WEB PAGE |
| TITLE OF WEB PAGE |
| NUMBER OF SELECTIONS OF WEB PAGE |
| SELECTION TIME OF WEB PAGE |

FIG.3C

USER INFORMATION DB 422

| USER ID | KEYWORD (FIRST KEYWORD) | URL | TITLE | NUMBER OF SELECTIONS | SELECTION TIME |
|---|---|---|---|---|---|
| 0001 | MOUNT FUJI | http://fujisan.abc/ | CLIMBING MOUNT FUJI | 1 | 2011.3.3 10:00 |
|  | TRAVEL | http://travel.abc/z01/ | FOREIGN TRAVEL ABC | 3 | 2011.4.3 11:20 |
|  |  | http://travel.bcd/x02 | ACCOMMODATION AND HOTEL RESERVATION | 1 | 2011.4.30 9:03 |
|  |  | http://travel.xyz/ | PRICE COMPARISON SITE OF LOW-COST AIRLINE TICKET | 10 | 2011.5.1 7:00 |
|  |  | http://travel.ggg/www/ | HOT SPRING TRAVEL | 2 | 2011.3.2 10:00 |
|  |  | http://travel.rrr/zre/so03/ | OKINAWA TRIP WITH SO TRAVEL | 5 | 2011.1.3 10:00 |
|  | HOT SPRING | http://travel.ggg/www/ | HOT SPRING TRAVEL | 2 | 2011.3.2 10:00 |
|  | TELEVISION CHEAP | http://television.bbb/ | LET'S BUY CHEAP TELEVISION | 1 | 2008.10.3 1:20 |
|  |  | http://kaden.shop/ | MASS MERCHANDISER MARKET OF HOUSEHOLD APPLIANCES / DOWNTOWN TOKYO | 3 | 2011.5.30 8:03 |
|  |  | http://ekisyou.fff/ | LOW PRICE SALES OF LIQUID-CRYSTAL TELEVISIONS | 1 | 2010.5.2 7:00 |
|  | RESTAURANT | http://restrant.tokyo/ | RESTAURANT TOKYO | 1 | 2010.4.3 12:01 |
|  |  | http://frenchl.res/ | FRENCH FOOD AAA | 1 | 2011.4.30 19:03 |
|  |  | http://wasyoku.res/ | JAPANESE RESTAURANT | 2 | 2010.5.1 19:01 |
|  |  | http://italian.a/res/ | ITALIAN PASTA Z | 2 | 2010.6.2 12:00 |
|  |  | http://cyuuka.sss/ | CHINESE FOOD K | 1 | 2011.1.3 13:00 |
| 0002 | CAR | http://............ | ......... | ...... | ...... |
| 0003 | ......... | http://............ | ......... | ...... | ...... |

DISPLAY EXAMPLE OF KEYWORD INPUT PAGE

DISPLAY EXAMPLE OF SEARCH RESULT PAGE

INFORMATION PROCESSING APPARATUS, INFORMATION PROCESSING METHOD, INFORMATION PROCESSING PROGRAM, RECORDING MEDIUM HAVING STORED THEREIN INFORMATION PROCESSING PROGRAM

CROSS REFERENCE TO RELATED APPLICATIONS

This application is a National Stage of International Application No. PCT/JP2012/054561 filed Feb. 24, 2012, claiming priority based on Japanese Patent Application No. 2011-167362 filed Jul. 29, 2011, the contents of all of which are incorporated herein by reference in their entirety.

TECHNICAL FIELD

The present invention relates to a technical field of search systems and the like which search information provided on a network.

BACKGROUND ART

In the past, there have been known search systems configured by a web server and a search engine (see, for example, Patent Literature 1). In such a search system, information including keywords input by a user of a terminal device is searched by the search engine, and a list of the search results is displayed on the terminal device. In the list of the search results, for example, page summaries or page names (or site names), in which URLs of web pages displaying the searched information (also URLs of web sites providing the corresponding web pages) are embedded, are displayed so as to be selectable by a user. For example, when the user of the terminal device selects a desired page name displayed in the list of the search results, a browser of the terminal device acquires a web page by accessing an URL embedded in the corresponding page name.

On the other hand, there has been known bookmark management systems that allow a user to previously register a correspondence relation between a site name and a URL of the site as a bookmark, and can call an URL corresponding to a site name partially matched with an input keyword (see, for example, Non-Patent Literature 1).

CITATION LIST

Patent Literature

Patent Literature 1: JP 2007-034466 A

Non-Patent Literature

Non-Patent Literature 1: John Marshall, "GMarks:Add-ons for Firefox", Mar. 29, 2011, [online], searched on Jul. 6, 2011, Internet <URL: https://adddons.mozilla.org/ja/firefox/addon/gmarks/>

SUMMARY OF THE INVENTION

Problem to be Solved by the Invention

However, the conventional search system takes time and labor because the user needs to select the page name or the like, in which the URL is embedded, from the list of search results. Further, the system suggested in Non-Patent Literature 1 takes time and labor because the user needs to previously register the correspondence relation between the site name and the URL of the site as the bookmark.

Therefore, the present invention has been made in view of the above problems and is directed to provide an information processing apparatus, an information processing method, an information processing program, and a recording medium having stored therein the information processing program, which can efficiently present web pages related to a word input by a user while reducing the user's labor.

Means for Solving the Problem

In order to solve the above problem, the invention according to claim 1 is an information processing apparatus comprising:

a registering means that registers a first word used for search of information provided on a network and location information indicating locations of web pages, which are selected by a user among a plurality of web pages including information searched by the first word, on the network, in association with each other; and a controlling means that presents at least one piece of the location information to be selectable among the location information associated with the first word including at least a part of a second word, according to input of the second word used for search of information provided on the network.

According to the present invention, the web pages related to the word input by the user can be efficiently presented while reducing the user's labor.

The invention according to claim 2 is the information processing apparatus according to claim 1, further comprising a determining means that determines a presentation order of the web pages, based on a predetermined condition, wherein the controlling means presents the location information of the web pages to be selectable, based on the presentation order of the web pages determined by the determining means.

According to the present invention, the location information of the web pages satisfying the predetermined condition can be presented to the user so that the user can easily select them.

The invention according to claim 3 is the information processing apparatus according to claim 2, wherein the registering means registers the number of selections of the selected web pages in association with each piece of the location information of the web pages, and the determining means determines a presentation order of the location information of the web pages by giving a higher priority to the web pages whose number of selections is larger.

According to the present invention, the location information of the web pages the user has frequently browsed can be presented to the user so that the user can easily select them.

The invention according to claim 4 is the information processing apparatus according to claim 2, wherein the registering means registers selection time of the selected web pages or search time of the web pages in association with each piece of the location information of the web pages, and the determining means calculates a time difference between an input time of the second word and the selection time or the search time associated with the location information of the web pages, and determines the presentation order of the location information of the web pages by giving a higher priority to the web pages having a smaller time difference.

According to the present invention, the location information of the web pages the user has recently browsed can be presented to the user so that the user can easily select them.

The invention according to claim 5 is the information processing apparatus according to claim 2, wherein the registering means registers selection time of the selected web pages or search time of the web pages in association with each piece of the location information of the web pages, and the determining means determines the presentation order of the location information of the web pages by giving a higher priority to the location information of the web pages in which the selection time or the search time is included in the same time range as a time range in which an input time of the second word is included, the time range being divided into a plurality of ranges.

According to the present invention, the location information of the web pages suitable for the time range in which the user inputs the second keyword can be presented to the user so that the user can easily select them.

The invention according to claim 6 is the information processing apparatus according to claim 1, further comprising a specifying means that specifies the location information of the web pages satisfying a predetermined condition among the location information of the web pages associated with the first word, wherein the controlling means presents the location information of the web pages, which is specified by the specifying means, to be selectable in a presentation form according to the condition.

According to the present invention, the location information of the web pages satisfying the predetermined condition can be presented to the user so that the user can easily select them.

The invention according to claim 7 is the information processing apparatus according to claim 6, wherein the registering means registers the number of selections of the selected web pages in association with each piece of the location information of the web pages, and the specifying means specifies a predetermined number as the location information of the web pages satisfying the condition by giving a higher priority to the location information of the web pages whose number of selections is larger.

According to the present invention, the location information of the web pages the user has frequently browsed can be presented to the user so that the user can easily select them.

The invention according to claim 8 is the information processing apparatus according to claim 6, wherein the registering means registers selection time of the selected web pages or search time of the web pages in association with each piece of the location information of the web pages, and the specifying means calculates a time difference between an input time of the second word and the selection time or the search time associated with each piece of the location information of the web pages, and specifies a predetermined number as the location information of the web pages satisfying the condition by giving higher priority to the location information of the web page having a smaller time difference.

According to the present invention, the location information of the web pages the user has recently browsed can be presented to the user so that the user can easily select them.

The invention according to claim 9 is the information processing apparatus according to claim 6, wherein the registering means registers selection time of the selected web pages or search time of the web pages in association with each piece of the location information of the web pages, and the specifying means specifies the location information of the web pages, in which the selection time or the search time is included in the same time range as a time range in which an input time of the second word is included, the time range being divided into a plurality of ranges, as the location information of the web pages satisfying the condition.

According to the present invention, the location information of the web pages suitable for the time range in which the user inputs the second keyword can be presented to the user so that the user can easily select them.

The invention according to claim 10 is the information processing apparatus according to any one of claims 1 to 9, wherein when a display time of the web page selected by a user is equal to or greater than a predetermined time, the registering means registers the location information of the web page in association with the first word.

According to the present invention, when the web page selected by the user is a web page that is not intended by the user, or even when the user erroneously selects a web page, it is possible to avoid registering the location information of such an unnecessary web page.

The invention according to claim 11 is an information processing method, which is executed by a computer, the information processing method comprising:

a step of registering a first word used for search of information provided on a network and location information indicating a location of a web page, which is selected by a user among a plurality of web pages including information searched by the first word, on the network, in association with each other; and a step of presenting at least one piece of the location information to be selectable among the location information associated with the first word including at least a part of a second word, according to input of the second word used for search of information provided on the network.

The invention according to claim 12 is an information processing program which causes a computer to function as:

a registering means that registers a first word used for search of information provided on a network and location information indicating a location of a web page, which is selected by a user among a plurality of web pages including information searched by the first word, on the network, in association with each other; and a controlling means that presents at least one piece of the location information to be selectable among the location information associated with the first word including at least a part of a second word, according to input of the second word used for search of information provided on the network.

The invention according to claim 13 is a recording medium having stored therein an information processing program which causes a computer to function as:

a registering means that registers a first word used for search of information provided on a network and location information indicating a location of a web page, which is selected by a user among a plurality of web pages including information searched by the first word, on the network, in association with each other; and a controlling means that presents at least one piece of the location information to be selectable among the location information associated with the first word including at least a part of a second word, according to input of the second word used for search of information provided on the network.

Advantageous Effect of Invention

According to the present invention, the web pages related to the word input by the user can be efficiently presented while reducing the user's labor.

BRIEF DESCRIPTION OF DRAWINGS

FIG. 3A and FIG. 3B are diagrams illustrating examples of items registered in a variety of databases. FIG. 3C is a diagram illustrating an example of contents registered in a page information database 422.

MODE FOR CARRYING OUT THE INVENTION

Hereinafter, embodiments of the present invention will be described with reference to the drawings. Note that embodiments described below are embodiments in a case where the present invention is applied to an information providing system.

[1. Schematic Configuration and Function of Information Providing System]

First, a schematic configuration and function of an information providing system S according to an embodiment of the present invention will be described with reference to FIG. 1.

Figure 1:
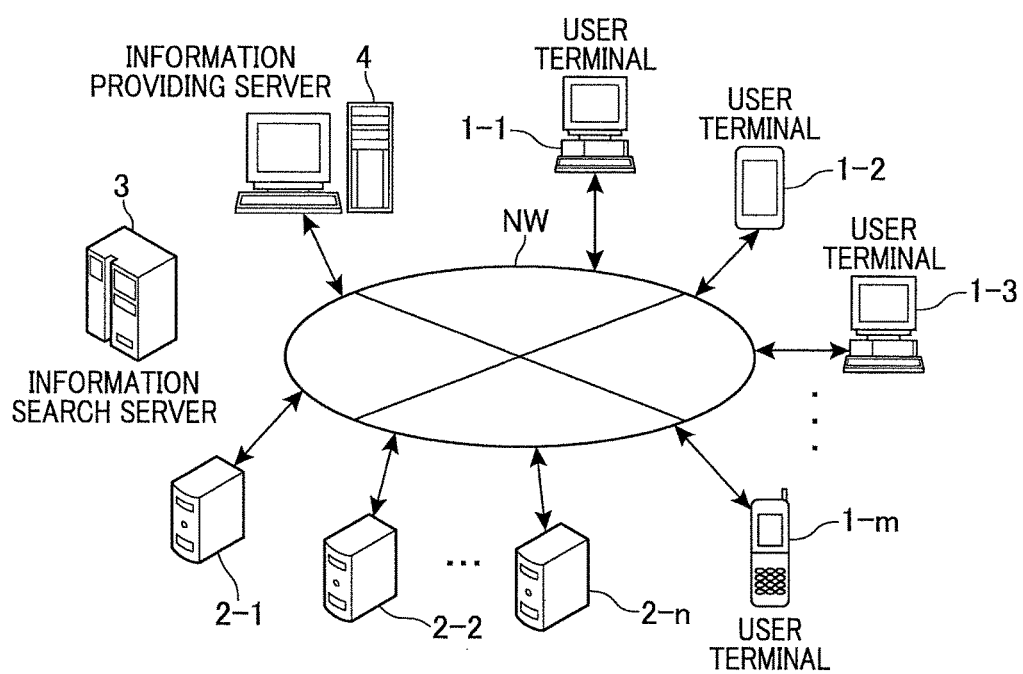
FIG. 1 is a diagram illustrating an example of a schematic configuration of an information providing system S according to the present embodiment.

FIG. 1 is a diagram illustrating an example of a schematic configuration of the information providing system S according to the present embodiment. As illustrated in FIG. 1, the information providing system S includes a plurality of user terminals 1-$j$ (j=1, 2, ... m), a plurality of web servers 2-$k$ (k=1, 2 ... n), an information search server 3, and an information providing server 4 (example of an information processor).

The user terminals 1-$j$, the web servers 2-$k$, the information search server 3, and the information providing server 4 are configured to be capable of mutually transmitting and receiving data through a network NW by using, for example, TCP/IP as a communication protocol. Note that the network NW is constructed by, for example, Internet, a dedicated communication line (for example, community antenna television (CATV) line), a mobile communication network (including a base station and the like), and a gateway.

The user terminals 1-$j$ have a web browser function and are configured to acquire web pages by accessing the web servers 2-$k$ or the information providing server 4 and display the web pages within a window screen displayed on a display, according to an operation instruction from a user. Note that a personal computer (PC), a mobile phone, a personal digital assistant (PDA), a smartphone converged with a mobile phone and a portable information terminal, or a portable game machine can be applied as the user terminals 1-$j$. Further, an operation unit for receiving an operation instruction from users of the user terminals 1-$j$ may be any one of a keyboard, a mouse, a remote controller, and a touchscreen interface.

The web servers 2-$k$ are a server that provides the user terminals 1-$j$ with web pages from a web site as a group of web pages present under a specific domain name on the network NW (in other words, a web site in which a group of web pages are registered). A lot of web sites are provided in, for example, each of the web servers 2-$k$. Further, a unique uniform resource locator (URL) is assigned to each web site. The URL is an example of location information indicating a location of the web site on the network NW. Note that the web page displays information provided on the network NW and is constituted by, for example, structured document files, such as hyper text markup language (HTML) documents or XHTML documents. Further, a unique URL is assigned to each web page. The URL of the web page includes a URL of a web site that registers the web page.

The information search server 3 is a server that searches information provided on the network NW (in other words, web pages including the corresponding information). The information search server 3 includes a search engine (software) that searches web pages by using keywords input by the users of the user terminals 1-$j$.

The information providing server 4 is a server that transmits the keywords input by the users of the user terminals 1-$j$ to the information search server 3 so as to cause the information search server 3 to perform a search using the keywords, acquires the search results from the information search server 3, and provides the search results to the user terminals 1-$j$. Note that the information providing server 4 includes, for example, a web server, a database server, and the like.

Figure 2:
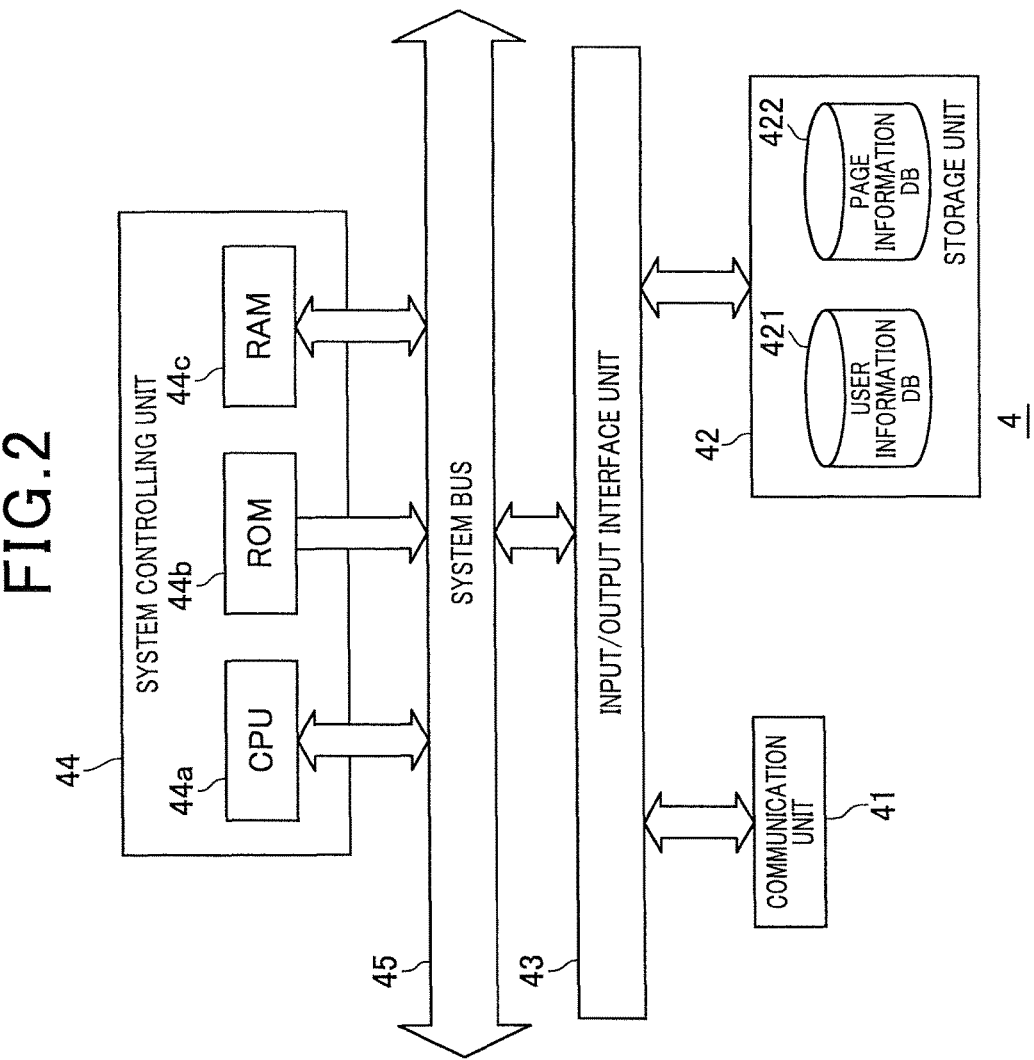
FIG. 2 is a block diagram illustrating an example of a schematic configuration of an information providing server 4 according to the present embodiment.

FIG. 2 is a block diagram illustrating an example of a schematic configuration of the information providing server 4 according to the present embodiment. As illustrated in FIG. 2, the information providing server 4 includes a communication unit 41, a storage unit 42, an input/output interface unit 43, and a system control unit 44. The system control unit 44 and the input/output interface unit 43 are connected through a system bus 45.

The communication unit 41 is configured to access the network NW and control communication states of the user terminals 1-$j$ and the information search server 3.

The storage unit 42 is configured by, for example, a hard disk drive or the like, and stores various programs, such as an operating system and a server program (including an information processing program of the present invention). Note that the server program, for example, may be distributed from a predetermined server or the like through the network NW, or may be provided in a state of being recorded on a recording medium, such as a compact disc (CD), a digital versatile disc (DVD), or the like.

Further, the storage unit 42 stores structured document files constituting web pages to be displayed on the user terminals 1-j. Examples of such web pages include a page that allows a user to input a keyword for searching information provided on the network NW (hereinafter, referred to as a "keyword input page"), and a page that displays the search result obtained using the input keyword (hereinafter, referred to as a "search result page").

Furthermore, a user information database (DB) 421, a page information database (DB) 422, and the like are constructed in the storage unit 42.

FIG. 3A and FIG. 3B are diagrams illustrating examples of items registered in a variety of databases.

As illustrated in FIG. 3A, user ID, login ID, password, name, address, and email address of a user who is registered as a member, are registered (recorded) in the user information database 421 in association with each of users. The user ID is identification information unique to each of the users. The login ID and the password are authentication information used for login processing (user's authentication processing).

Next, as illustrated in FIG. 3B, a user ID of a user, a keyword (example of a first word), a URL of a web page, a title of the web page, number of selections of the web page, and selection time of the web page are registered (recorded) in the page information database 422 in association with each of the users. The keyword is a keyword that is input by the user of the user terminal 1-j and is used for search of information provided on the network NW (in other words, search of web pages). Note that a plurality of words (spacebars are input between the words) may be a single keyword.

Further, the URL of the web page is a URL of a web page that is selected by the user among the web pages searched by the keyword input by the user. Herein, the selected web page refers to a web page that is displayed on the user terminal 1-j by the user's selection among the web pages searched by the keyword. Further, the title of the web page includes, for example, a headline or summary of the web page, or a site name of a web site providing the web page. Note that the title of the web page is an example of location information along with the URL. Further, the number of selections (selection frequency) of the web page is, for example, cumulative number of selections of the web page searched by the keyword. Note that the cumulative number may be configured to include a selection of the web page from a list of URL presentations, which is to be described below. Further, the selection time of the web page is a selection time when the web page searched by the keyword has been selected. The selection time may include a date (year, month, and day). When the web page is selected more than once, the latest selection time is registered for example. Note that instead of the selection time of the web page, a search time of the web page may be registered. The search time of the web page is a search time of a web page that is selected by the user among search times of the web page searched by the keyword. The search time may include a date (year, month, and day).

Further, FIG. 3C is a diagram illustrating an example of contents registered in the page information database 422. A keyword "travel" illustrated in FIG. 3C is associated with URLs of a plurality of web pages. This corresponds to, for example, a case where after displaying a certain web page by a user's selection among the search results searched by the corresponding keyword, the search results are displayed again by a designation of, for example, a "back button" of a web browser, and a next page is displayed by a user's selection among the search results. Further, "travel" and "hot spring" are different keywords, but there are some cases where URLs of web pages associated with the keyword "hot spring" are included among URLs of web pages associated with the keyword "travel". In this case, the number of selections of the web pages associated with the keyword "travel" and the number of selections of the web pages associated with the keyword "hot spring" may be independently counted, or may be commonly counted. In the former case, the number of selections is different from each other, but in the latter case, the number of selections is equal to each other. In the example illustrated in FIG. 3C, the number of selections of web pages of the title "hot spring travel" associated with the keyword "travel" and the number of selections of web pages of the title "hot spring travel" associated with the keyword "hot spring" are commonly counted. For example, when the web page of the title "hot spring travel" is searched by the keyword "hot spring" and is selected, the number of selections associated with the keyword "hot spring" is incremented by 1, and the number of selections associated with the keyword "travel" is also increased by 1. This puts more emphasis on the user's selection of the web page of the title "hot spring travel" than by which keyword the web page of the title "hot spring travel" has been searched. Therefore, the number of selections in this case may be considered as information to which the degree of user's interest in the web page of "hot spring travel" is further reflected.

Note that in the above example, the user information database 421 and the page information database 422 are separated, but the user information database 421 and the page information database 422 may be integrated. Further, the various databases may be provided in a storing means of a predetermined server to which the information providing server 4 is accessible.

The input/output interface unit 43 is configured to perform interface processing among the communication unit 41, the storage unit 42, and the system control unit 44.

The system control unit 44 is configured by a central processing unit (CPU) 44a, a read only memory (ROM) 44b, a random access memory (RAM) 44c, and the like.

The system control unit 44 as a computer performs processing, which is to be described below, by executing a server program stored in the storage unit 42. The system control unit 44 functions as a registering means, a controlling means, a determining means, and a specifying means of the present invention according to an information processing program of the present invention (that is, the information processing program of the present invention causes the system control unit 44 to execute the above-mentioned means). More specifically, as a first step, the system control unit 44 registers, in the page information database 422, a keyword (referred to as a "first keyword") input by the user of the user terminal 1-j and used for search of information provided on the network NW (search in the information search server 3) and an URL of a web page selected by the user among a plurality of web pages including the information searched by the first keyword, in association with each other. Next, as a second step, according to an input (input by the user of the user terminal 1-j) of a keyword (example of a second word, hereinafter referred to as a "second keyword") used for search of information provided on the network NW, the system control unit 44 presents at least one URL to be selectable among URLs of web pages associated with the first keyword including at least a part of the second keyword. The case of "presenting the URL to be selectable"

corresponds to a case where the URL itself is displayed so that the user can confirm it with eyes, or a case where the title or the like of the web page associated with the URL is displayed so that the user can confirm it with eyes (URL itself may not be visibly displayed).

[2. Operation of Information Providing System S]

Next, the operation of the information providing system S will be described.

(2-1. Operation of Registering URL of Web Page)

Figure 4A:
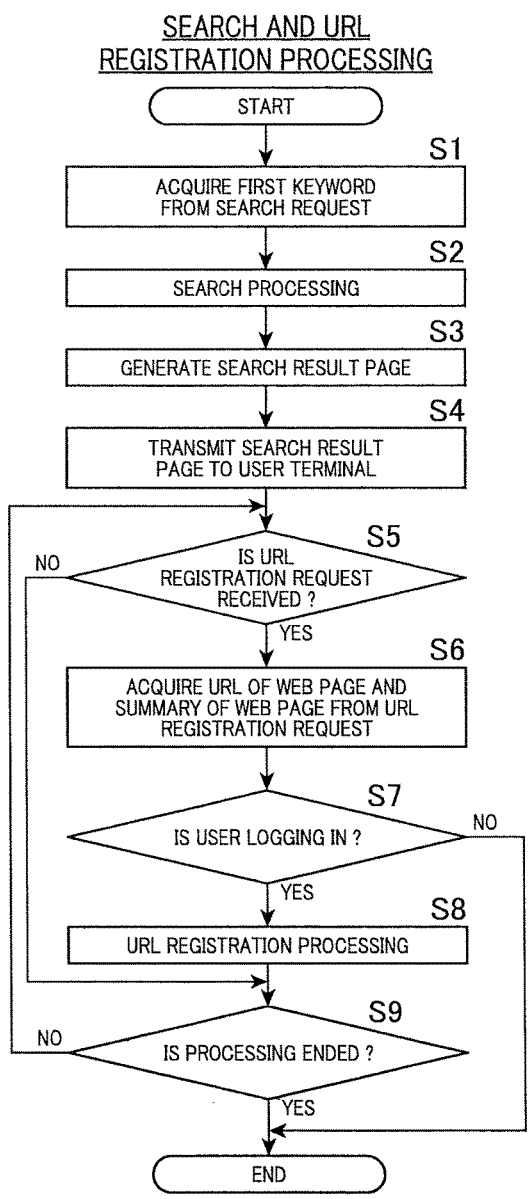
FIG. 4A is a flowchart illustrating search and URL registration processing of a system control unit 44 of the information providing server 4.

First, the operation of registering the URL of the web page will be described with reference to FIG. 4A or the like. The operation of registering the URL of the web page is an operation of registering the first keyword used for search of information provided on the network NW and the URL of the web page selected by the user among a plurality of web pages searched by the first keyword, in association with each other. FIG. 4A is a flowchart illustrating search and URL registration processing in the system control unit 44 of the information providing server 4. Note that in the following description, it is assumed that the user terminal 1-1 displays a keyword input page, which is acquired from the information providing server 4, on a window screen.

Figure 5A:
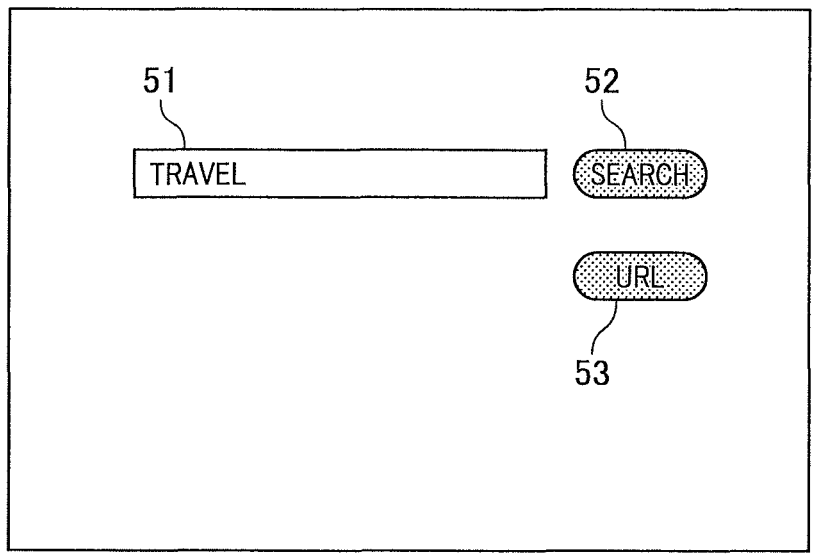
FIG. 5A is a diagram illustrating a display example of a keyword input page.

FIG. 5A is a diagram illustrating a display example of the keyword input page. A keyword input unit 51, which is capable of inputting a keyword used for search of information provided on the network NW, a search button 52, and a URL presentation button 53 are provided in the keyword input page illustrated in FIG. 5A. In the keyword input unit 51, the user of the user terminal 1-1 can input a desired first keyword (or a combination of a plurality of words) through an operation unit (a select input from input candidates is also included). Note that the input of the keyword may be performed in such a manner that a voice uttered by the user is recognized by a voice recognition function of the user terminal 1-1 and is then converted into a character. After inputting the first keyword, if the user of the user terminal 1-1 designates, for example, the search button 52 (for example, clicking by a mouse), a search request including the input first keyword (page request including a search query) is transmitted from the user terminal 1-1 through the network NW to the information providing server 4.

Then, when receiving the search request from the user terminal 1-1, the information providing server 4 starts search and URL registration processing illustrated in FIG. 4A. In step S1 illustrated in FIG. 4A, the system control unit 44 of the information providing server 4 acquires the first keyword from the received search request. Subsequently, the system control unit 44 performs search processing (step S2). In the search processing, the system control unit 44 transmits the received search request to the information search server 3. Then, the information search server 3 searches web pages by a search engine using the first keyword included in the received search request (that is, searches web pages including the first keyword). Then, the information search server 3 returns the search result, including URLs or the like of the searched web pages, to the information providing server 4. Note that the system control unit 44 is configured such that the information search server 3 performs the search using the first keyword and acquires the search result, but, as another example, the system control unit 44 may be configured such that the information providing server 4 is provided with the search engine and performs the search using the first keyword.

Then, the system control unit 44 of the information providing server 4 generates a search result page based on the search result returned from the information search server 3 (step S3). Subsequently, the system control unit 44 transmits the search result page to the user terminal 1-1 having transmitted the search request (step S4). In this way, the user terminal 1-1 displays the search result page received from the information providing server 4 on the window screen by the web browser.

Figure 5B:
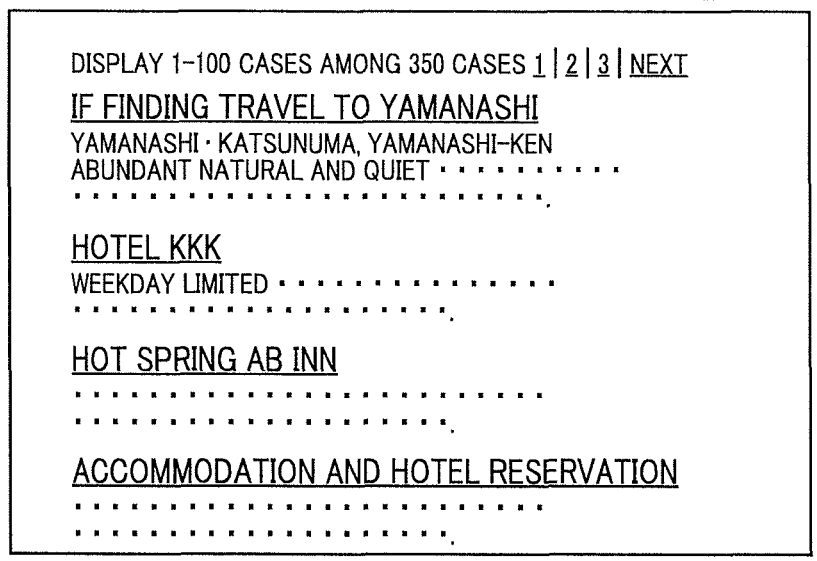
FIG. 5B is a diagram illustrating a display example of a search result page.

FIG. 5B is a diagram illustrating a display example of the search result page. As the search result, a list of web page summaries is displayed on the search result page illustrated in FIG. 5B. Further, in each of the web page summaries, an URL of each web page is embedded (URL is set as hyperlink). In such a display state, when the user of the user terminal 1-1 selects the URL of the desired web page by designating the summary (for example, clicking by the mouse), the user terminal 1-1 accesses the web server 2-k according to the URL of the web page selected by the user, acquires the corresponding web page, and displays the page on the window screen. Furthermore, the user terminal 1-1 transmits, to the information providing server 4, the URL registration request including the URL and summary of the web page selected by the user. In the structured document constituting the search result page, a script (for example, by JavaScript (registered trademark)) is described which defines the transmission of, for example, the URL registration request including the summary and URL of the web page selected by the user. The web browser of the user terminal 1-1 executes the script to perform the transmission of the URL registration request. Note that the URL registration request may be configured to include a selection time of the web page. The selection time of the web page is acquired from, for example, a clock function of the user terminal 1-1 by the web browser. Further, instead of the summary of the web page, it may be configured to transmit a headline of the web page or a site name of a web site in which the corresponding web page is registered. Further, it may be configured such that when a display time of the web page selected from the search result by the user is equal to or greater than a predetermined time (for example, previously set to 5 to 10 seconds), the URL registration request including the URL or the like of the web page is transmitted to the information providing server 4. In this way, when the display time of the web page selected by the user (in other words, stay time) is equal to or greater than the predetermined time, the URL or the like of the web page is registered in association with the first keyword in step S8 to be described below. Therefore, when the web page selected by the user is a web page that is not intended by the user, or even when the user erroneously selects a web page, it is possible to avoid registering the URL or the like of such an unnecessary web page. Note that the determination as to whether the display time of the web page is equal to or greater than the predetermined time, that is, the determination as to whether the predetermined time has elapsed after the display of the selected web page, is performed by the web browser. Alternatively, the determination as to whether the display time of the web page is equal to or greater than the predetermined time may be made based on time interval of information acquisition request that is based on a reception time of the information acquisition request from the user terminal 1-1, which is stored by the information providing server 4. In this case, the following step S8, the URL registration processing is performed under the condition that the time interval of the information acquisition request based on the reception time is equal to or greater than the predetermined time.

On the other hand, when receiving the URL registration request from the user terminal 1-1 (YES in step S5), the system control unit 44 of the information providing server 4 acquires the URL of the web page and the summary (or the site name or the like) of the web page from the received URL registration request (step S6). The summary (or the site name or the like) of the web page is acquired as the title of the corresponding web page. Note that when the selection time of the web page is included in the received URL registration request, the selection time is also acquired.

Subsequently, the system control unit 44 determines whether the user of the user terminal 1-1 has logged in (or is logging in) (step S7). When it is determined that the user has logged in by the login processing (YES in step S7), the system control unit 44 specifies the user ID of the user and proceeds to step S8. On the other hand, when it is determined that the user of the user terminal 1-1 has not logged in (NO in step S7), the search and URL registration processing is ended.

In step S8, the system control unit 44 performs URL registration processing. In the URL registration processing, the system control unit 44 registers, in the page information database 422, the first keyword acquired in step S1, the URL and title of the web page acquired in step S6, the specified user ID (the user ID of the user who is logging in), and the number of selections (in the case of the first registration, "1"), in association with one another. Note that when the selection time of the web page is included in the URL registration request, the selection time is also registered in association with the URL or the like of the web page. Further, instead of the selection time of the web page, the search time of the web page may be registered in association with the URL or the like of the web page. In this case, the search time of the web page is, for example, a time when the web page has been searched by the search engine.

By the way, there are some cases where the same first keyword (the same first keyword as the first keyword acquired in step S1) is already registered in the page information database 422 in association with the specified user ID (however, the same URL as the URL of the web page acquired in step S6 is not registered in association with the first keyword). In this case, in the URL registration processing, the URL of the web page acquired instep S6 and the number of selections (in the case of the first registration, "1") are registered in the page information database 422 in association with the first keyword. Furthermore, there are some cases where a set of the same first keyword and URL is already registered in the page information database 422 in association with the specified user ID. In this case, in the URL registration processing, the number of selections associated with the set of the first keyword and URL is incremented by 1, and is updated and registered in the page information database 422.

On the other hand, in step S9, the system control unit 44 determines whether to end the search and URL registration processing. For example, it is determined the processing is ended when a predetermined time has elapsed from the start of the search and URL registration processing (YES in step S9), and the corresponding processing is ended. On the other hand, when it is determined that the search and URL registration processing is not ended (NO in step S9), the system control unit 44 returns to step S5.

(2-2. Operation of Presenting URL of Web Page)

Figure 4B:
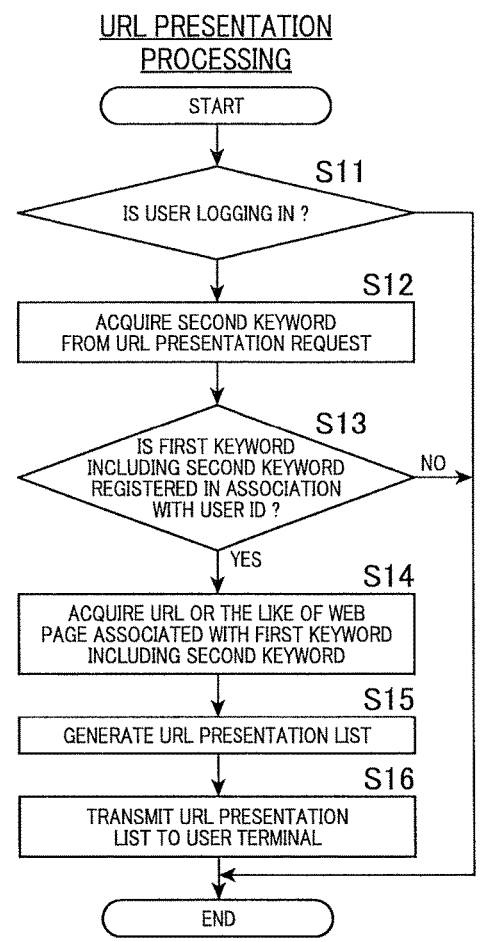
FIG. 4B is a flowchart illustrating URL presentation processing of the system control unit 44 of the information providing server 4.

Next, the operation of presenting the URL of the web page will be described with reference to FIG. 4B or the like. The operation of presenting the URL of the web page is an operation of presenting at least one URL to be selectable among URLs of web pages associated with the first keyword including at least a part of the second keyword, according to the input of the second keyword used for search of information provided on the network NW. FIG. 4B is a flowchart illustrating URL presentation processing in the system control unit 44 of the information providing server 4.

As described above, when the keyword and the URL of the web page are registered in the page information database 422 in association with the user ID, the URL presentation button 53 provided on the keyword input page illustrated in FIG. 5A can be used. When the user of the user terminal 1-1 inputs the desired second keyword through the operation unit (the select input from input candidates is also included) and designates, for example, the URL presentation button 53 (for example, clicking by a mouse), the URL presentation request including the input second keyword is transmitted from the user terminal 1-1 through the network NW to the information providing server 4. Note that the URL presentation request including the second keyword may be configured to be performed, for example, whenever a predetermined number of characters (for example, 1 character) are input as the second keyword. In this case, the URL presentation button 53 is unnecessary.

Then, when receiving the URL presentation request from the user terminal 1-1, the information providing server 4 starts URL presentation processing illustrated in FIG. 4B. In step S11 illustrated in FIG. 4B, the system control unit 44 determines whether the user of the user terminal 1-1 has logged in. When it is determined that the user has logged in by the login processing (YES in step S11), the system control unit 44 specifies the user ID of the user and proceeds to step S12. On the other hand, when it is determined that the user of the user terminal 1-1 has not logged in (NO in step S11), the URL presentation processing is ended. Note that when the user has not logged in, a message urging the login may be configured to be transmitted to the user terminal 1-1.

In step S12, the system control unit 44 acquires the second keyword from the received URL presentation request. Subsequently, the system control unit 44 determines whether the first keyword including the second keyword acquired in step S12 is registered in association with the specified user ID with reference to the page information database 422 (step S13). When it is determined that the first keyword including the second keyword is registered (YES in step S13), the system control unit 44 proceeds to step S14. On the other hand, when it is determined that the first keyword including the second keyword is not registered (NO in step S13), the URL presentation processing is ended. Note that when the first keyword including the second keyword is not registered, a message indicating no registration may be configured to be transmitted to the user terminal 1-1.

In step S14, the system control unit 44 acquires at least one URL and title of a web page from the page information database 422 among URLs and titles of web pages associated with the first keyword including the second keyword. For example, in a case where the user ID is "0001" and the second keyword is "television", an URL and title of a web page associated with the first keyword of "television" and "cheap" are acquired in the example illustrated in FIG. 3C. Note that in step S13, the system control unit 44 determines whether the first keyword matched with the second keyword acquired in step S12 is registered in association with the specified user ID. When registered, the system control unit 44 may be configured to proceed to step S14. In this case, for example, when the user ID is "0001" and the second keyword is "television", it is determined that the corresponding first keyword is not registered in the example illustrated in FIG. 3C. That is, in this case, when the second keyword is "television" and "cheap", it is determined that the corresponding first keyword is registered. Note that in step S14, it may be configured to acquire only the URL of the web page. Further, in a case where a plurality of URLs of web pages associated with the first keyword is registered, the system control unit 44 may be configured to acquire all URLs and titles of the web pages, or may be configured to acquire some URLs and titles of the web pages.

Subsequently, the system control unit 44 generates a URL presentation list based on the URLs and titles of the web pages acquired in step S14 (step S15). The URL presentation list is redirect information that presents the URLs and titles of the web pages, which are acquired in step S14, in a selectable manner. Note that, although the URL presentation list may be configured to include only the acquired URLs of the web pages as a redirect destination by the web browser, it is desirable that the user may grasp the summary of the web page more easily when the title of the web page is visibly displayed rather than the URL of the web page. Therefore, for example, in the URL presentation list, the title of the web page is set as display, and the URL of the web page is set as non-display.

Subsequently, the system control unit 44 transmits data of the URL presentation list generated in step S15 to the user terminal 1-1 having transmitted the URL presentation request (step S16). Thus, the user terminal 1-1 incorporates the data of the URL presentation list, which is received from the information providing server 4, into the keyword input page by the web browser (describes the data of the URL presentation list in the structured document of the keyword input page), and displays the URL presentation list on the keyword input page. In this way, the URL of the web page acquired in step S14 is presented to the corresponding user to be selectable according to the use's input of the second keyword.

Figure 6A:
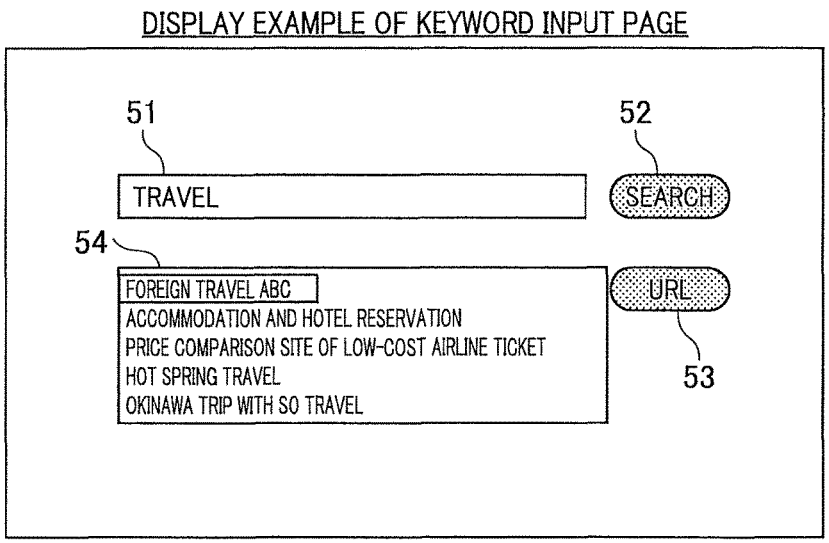
FIG. 6A is a diagram illustrating a display example of a URL presentation list displayed on the keyword input page.

FIG. 6A is a diagram illustrating a display example of the URL presentation list displayed on the keyword input page. In the URL presentation list 54 illustrated in FIG. 6A, the titles of the web pages associated with the second keyword "travel" are displayed in predetermined order (for example, in registration order) (the URLs of the web pages are set as non-display). In the URL presentation list 54 displayed in this way, when the user of the user terminal 1-1 selects the URL of the web page by designating the title of the desired web page (for example, clicking by the mouse), the user terminal 1-1 accesses the web server **2-*k* according to the URL of the web page selected by the user, acquires the corresponding web page, and displays the page on the window screen. In this manner, the corresponding web page is displayed just when the user selects the URL of the web page presented according to the input of the second keyword. Note that it may be configured such that the URL of the web page selected from the URL presentation list 54 is transmitted to the information providing server 4. In this case, the system control unit 44 of the information providing server 4 increments the number of selections by 1, the number of selections being registered in the page information database 422** in association with the received URL.

As described above, according to the present embodiment, the first keyword, which is used for the search of the information provided on the network NW, and the URL of the web page, which is selected by the user among the plurality of web pages including the information searched by the first keyword, are registered in association with each other, and then, the URLs of the web pages associated with the first keyword including the second keyword are presented to be selectable according to the input of the second keyword. Therefore, the web pages related to the keyword input by the user can be efficiently presented while reducing the user's labor. That is, as opposed to the prior art, the user need not manually register the correspondence relation between the site name and the URL of the web page as the bookmark, and the first keyword and the URL of the web page are automatically registered in the flow of the input of the first keyword and the browsing operation, thereby reducing the user's labor. Further, it is possible to reduce the user's labor for selecting a transition destination every time among the plurality of URLs of the web pages included in the search result by the input of the keyword.

Furthermore, according to the embodiment, the traffic for search can be reduced because the information providing server 4 less causes the information search server 3 to perform the search through the network NW using the keyword.

Modification 1

According to modification 1 of the embodiment, in step S15, the system control unit 44 may be configured to specify URLs of web pages satisfying a predetermined condition among the URLs of the web pages acquired in step S14, and generate a URL presentation list that presents the specified URLs or titles of the web pages to be selectable in a presentation form according to the corresponding condition. In this case, the presentation form of the specified URLs or titles of the web pages according to the condition is set in the data of the URL presentation list. By transmitting the URL presentation list generated in this way to the user terminal 1-1, the URLs or the like of the web pages specified as satisfying the predetermined condition are presented to be selectable in the presentation form according to the corresponding condition.

As such a presentation form, for example, a character size, color (or background color), and font of the URL or title of the web page satisfying the predetermined condition may be highlighted by comparing the URL or title of the web page satisfying no predetermined condition. For example, the character of the URL or title of the web page satisfying the predetermined condition may be made large or may be noticeably displayed with clear color.

Figure 6B:
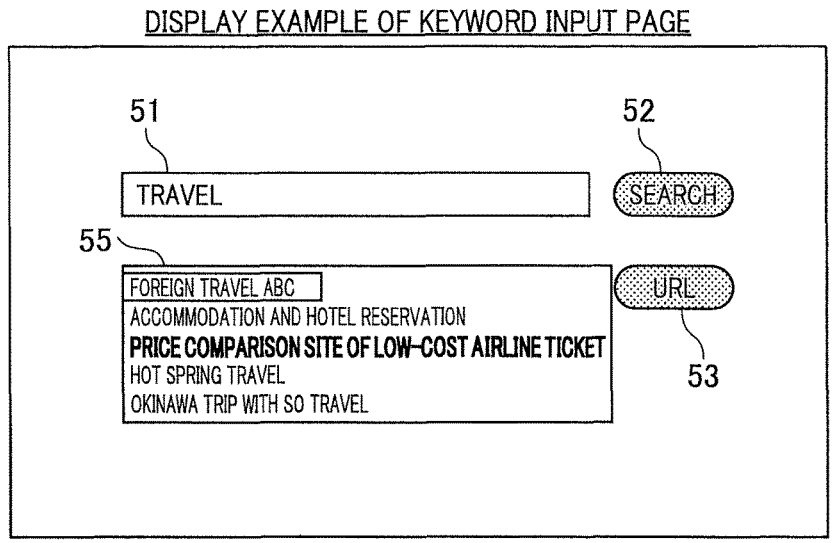
FIG. 6B is a diagram illustrating a display example of the URL presentation list that presents URLs and the like of web pages in a presentation form according to the number of selections of the web pages.

Further, as the predetermined condition, there may be a condition based on, for example, number of selections, selection time, or search time of the web page. Such a condition is arbitrarily set by, for example, a system administrator. For example, as an example of the case of applying the condition based on the number of selections of the web page, the system control unit 44 specifies a predetermined number of URLs of web pages as the URLs of the web pages satisfying the corresponding condition, based on the number of selections registered in association with the URLs of the web pages (for example, ranking Nos. 1 to 3 in the number of selections, or only ranking No. 1 in the number of selections). The URL or title of the web page specified in this way is presented to be selectable on the URL presentation list in the presentation form according to the number of selections. Therefore, the URLs of the web pages the user has frequently browsed can be presented to the user so that the user can easily select them. FIG. 6B is a diagram illustrating a display example of the URL presentation list that presents URLs of web pages in the presentation form based on the number of selections of the web pages. In the URL presentation list 55 illustrated in FIG. 6B, the character of the title of the web page having the largest number of selections among the titles of the web pages associated with the second keyword "travel" is displayed in a larger size than the characters of other titles.

Further, as an example of the case of applying the condition based on the selection time or search time of the web page, the system control unit 44 specifies a predetermined number of URLs of web pages as the URLs of the web pages satisfying the corresponding condition, based on the selection time or search time registered in association with the URLs of the web pages and the input time of the second keyword (for example, ranking Nos. 1 to 3 in ascending order of time difference from the selection time or search time to the input time, or only ranking No. 1 in ascending order of time difference from the selection time or search time to the input time). For example, in this case, the system control unit 44 calculates a time difference between the input time of the second keyword and the selection time or search time registered in association with the URL of the web page, and specifies a predetermined number of URLs of web pages as the URLs of the web pages satisfying the corresponding condition, based on the time difference (for example, ranking Nos. 1 to 3 in ascending order of the time difference, or only ranking No. 1 in ascending order of the time difference). The URL or title of the web page specified in this way is presented to be selectable on the URL presentation list in the presentation form according to the time difference. Therefore, the URLs of the web pages the user has recently browsed can be presented to the user so that the user can easily select them. Note that the input time of the second keyword is acquired from, for example, the clock function of the user terminal 1-1 by the web browser, is included in the URL presentation request, and is transmitted from the user terminal 1-1 to the information providing server 4. Alternatively, the input time may be a reception time when the URL presentation request has been received by the information providing server 4, or may be a current time (that is, time when step S14 is executed).

Figure 7A:
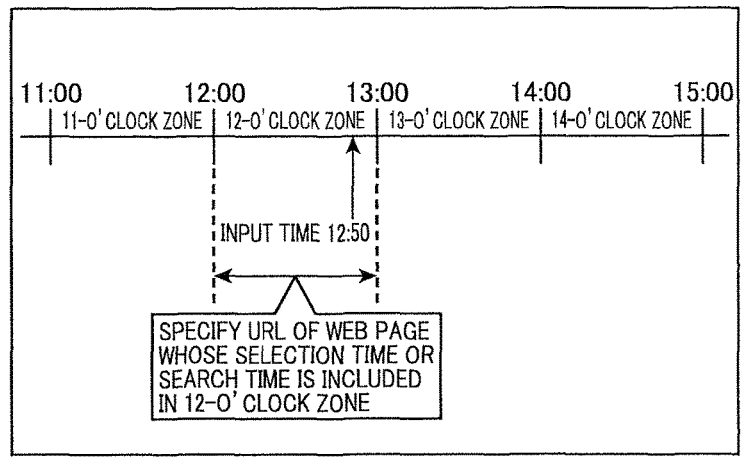
FIG. 7A and FIG. 7B are diagrams illustrating examples of a time range.
Figure 7B:
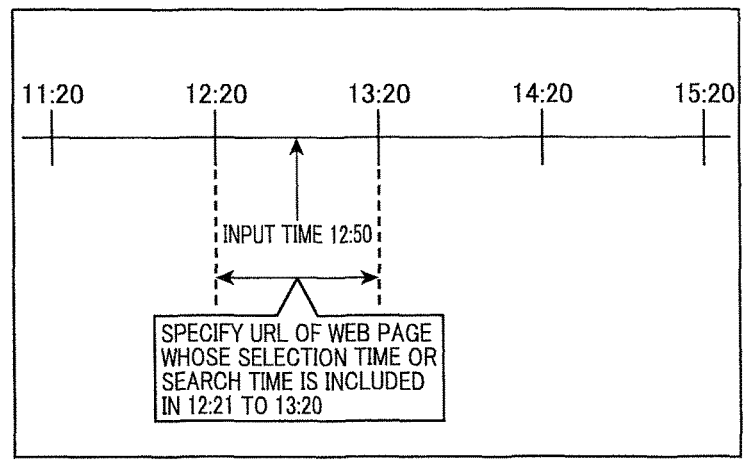

Further, as another example of the case of applying the condition based on the selection time or search time of the web page, the system control unit 44 specifies the URLs of the web pages whose selection time or search time is included in the same time range as the time range in which the input time of the second keyword is included, as the URLs of the web pages satisfying the corresponding condition. The URL or title of the web page specified in this way is presented to be selectable on the URL presentation list in the presentation form according to the time range. The time range is a time range obtained by dividing, for example, 24 hours a day into multiple parts. FIG. 7A and FIG. 7B are diagrams illustrating examples of the time range. The example illustrated in FIG. 7A illustrates time ranges divided every hour, such as 12-o'clock zone (12:00 to 12:59) and 13-o'clock (13:00 to 13:59). When the input time of the second keyword is "12:50", the URLs of the web pages, whose selection time or search time is included in the 12-o'clock zone to which "12:50" belongs, are specified. On the other hand, the example illustrated in FIG. 7B illustrates time ranges divided every hour, such as "12:21 to 13:20" and "13:21 to 14:20". When the input time of the second keyword is "12:50", the URLs of the web pages, whose selection time or search time is included in "12:21 to 13:20" to which "12:50" belongs, are specified. Therefore, the URLs of the web pages suitable for the time range in which the user inputs the second keyword can be presented to the user so that the user can easily select them. For example, in a case where the user ID is "0001", the second keyword is "restaurant", and the input time belongs to 19-o'clock zone, URLs or the like of the web pages, whose selection time is, for example, 19-o'clock zone among the web pages associated with the first keyword "restaurant" can be presented to be easily selectable in the example illustrated in FIG. 3C. Therefore, for example, the user can quickly browse the web pages of restaurants desired to be used for dinner. Note that the time range is not limited to the 1-hour basis. For example, the time range may be every two hours or every three hours.

Modification 2

According to modification 2 of the embodiment, in step S15, the system control unit 44 may be configured to determine the presentation order of the URLs of the web pages, based on a predetermined condition, with respect to the URLs of the web pages acquired in step S14, and generate a URL presentation list that presents the URLs or titles of the web pages to be selectable based on the determined presentation order. In this case, the determined presentation order is set in the data of the URL presentation list. By transmitting the URL presentation list generated in this way to the user terminal 1-1, the URLs or the like of the web pages are presented to be selectable based on the determined presentation order.

The presentation order is a display order when the URLs or titles of the web pages are displayed in the URL presentation list. Further, as the predetermined condition, as in modification 1, there may be a condition based on, for example, number of selections, selection time, or search time of the web page.

Figure 6C:
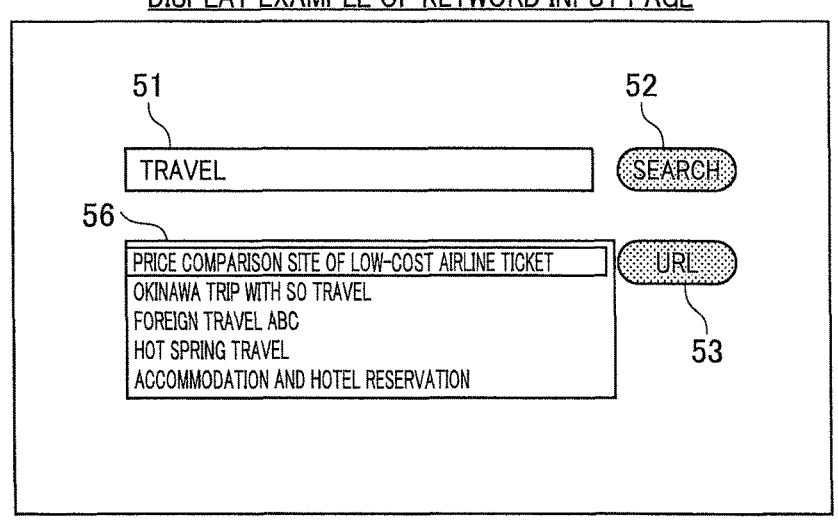
FIG. 6C is a diagram illustrating a display example of the URL presentation list that presents URLs and the like of web pages in presentation order according to the number of selections of the web pages.

For example, as an example of the case of applying the condition based on the number of selections of the web page, the system control unit 44 determines the URL presentation order of the web pages while giving higher priority to the web page having a larger number of selections registered in association with the URL of the web page. For example, as the number of selections is larger, the corresponding web page has a higher presentation order (upper portion of the URL presentation list). In the presentation order determined in this way, the URLs or titles of the web pages are presented to be selectable on the URL presentation list. Therefore, as in the first embodiment, the URLs of the web pages the user has frequently browsed can be presented to the user so that the user can easily select them. FIG. 6C is a diagram illustrating a display example of the URL presentation list that presents URLs of web pages in the presentation order according to the number of selections of the web pages. In the URL presentation list 56 illustrated in FIG. 6C, the titles of the web pages associated with the second keyword "travel" are displayed from the upper part in descending order of the number of selections of the web pages, as illustrated in FIG. 3C.

For example, as an example of the case of applying the condition based on the selection time or search time of the web page, the system control unit 44 determines the URL presentation order of the web pages while giving higher priority to the web page whose selection time or search time registered in association with the URL of the web page is closer to the input time of the second keyword. For example, as the selection time or search time is closer to the input time, the corresponding web page is located at an upper position in terms of the presentation order. In the presentation order determined in this way, the URLs or titles of the web pages are presented to be selectable on the URL presentation list. Therefore, as in the first embodiment, the URLs of the web pages the user has recently browsed can be presented to the user so that the user can easily select them. Note that as in modification 1, the determination as to whether the selection time or search time is closer to the input time is made by, for example, calculating a time difference between the input time of the second keyword and the selection time or search time.

Further, as another example of the case of applying the condition based on the selection time or search time of the web page, the system control unit 44 determines the URL presentation order of the web pages by giving higher priority to the URLs of the web pages whose selection time or search time is included in the same time range as the time range in which the input time of the second keyword is included. For example, the web page, whose selection time or search time is included in the same time range as the time range in which the input time is included, is located at an upper position in terms of the presentation order. In the presentation order determined in this way, the URLs or titles of the web pages are presented to be selectable on the URL presentation list. Therefore, as in the first embodiment, the URLs of the web pages suitable for the time range in which the user inputs the second keyword can be presented to the user so that the user can easily select them.

Note that in step S14 of the embodiment, it may be configured to acquire the URL of the web page satisfying the predetermined condition. As this condition, as in modification 1, there may be a condition based on, for example, number of selections, selection time, or search time of the web page.

Further, in the present embodiment, an example in which the information providing server 4 functions as the information processing apparatus of the present invention has been described, but, as another example, the user terminal 1-1 may be configured to function as the information processing apparatus of the present invention. In the case of this configuration, the information processing program of the present invention is installed on the user terminal 1-1. For example, the information processing program is installed as the plug-in software of the web browser, and the keyword input unit 51, the search button 52, and the URL presentation button 53 described above are displayed on a toolbar (menu bar) provided on an upper portion of a display screen of the web browser. The user terminal 1-*j*(CPU as a registering means) registers, in the page information database 422 of the information providing server 4, the first keyword input to the keyword input unit 51 of the toolbar by the user and used for the search of the information provided on the network NW (search in the information search server 3 or the information providing server 4) and the URL of the web page selected by the user among the plurality of web pages including the information searched by the first keyword, in association with each other. That is, the user terminal 1-*j* registers the first keyword and the URL of the web page by transmitting a URL registration request including the first keyword and the URL of the selected web page. Next, the user terminal 1-*j*(CPU as a controlling means) presents at least one URL to be selectable among URLs of web pages associated with the first keyword including at least a part of the second keyword, according to the input of the second keyword used for search of information provided on the network NW. That is, the user terminal 1-*j* acquires the data of the URL presentation list by transmitting the URL presentation request including the input second keyword, and presents the URL of the web page to be selectable. Note that in the case of this configuration, the information processing program installed on the user terminal 1-*j*, for example, may be downloaded from a predetermined server or the like through the network NW, or may be read from a recording medium having stored therein the program, such as a CD, a DVD, or the like.

REFERENCE SIGNS LIST

1-*j* user terminal
2-*k* web server
3 information search server
4 information providing server
41 communication unit
42 storage unit
43 input/output interface unit
44 system control unit
45 system bus
NW network

The invention claimed is:

1. An information processing apparatus comprising:
at least one memory configured to store computer program code;
at least one processor configured to access said memory, read said computer program code, and execute according to said computer program code,
said computer program code comprising:
registering code configured to cause at least one of said at least one processor to register a combination of at least one or more words used for search of information provided on a network and location information indicating locations of web pages, which are selected by a user among a plurality of web pages including information searched by the combination of at least one or more words, on the network, in association with each other; and
controlling code configured to cause at least one of said at least one processor to, in response to receiving an input of at least part of a word, included in the combination of at least one or more words, and prior to executing search of information provided on the network using the word, present at least one piece of the location information that is previously registered by the registering code in association with the combination of at least one or more words so that the at least one piece of the location information can be selected,
wherein the plurality of web pages include the information searched by a search engine by using, as an input keyword, the combination of at least one or more word, in response to a search request, and
the controlling code causes the at least one processor to present the at least one piece of the location information without transmitting the search request to the search engine.

2. The information processing apparatus according to claim 1, wherein:
said computer program code further comprises determining code configured to cause at least one of said at least one processor to determine a presentation order of the web pages, based on a predetermined condition, and
the controlling code is further configured to cause at least one of said at least one processor to present the location information of the web pages to be selectable, based on the presentation order of the web pages determined in accordance to the determining code.

3. The information processing apparatus according to claim 2,
wherein the registering code is further configured to cause at least one of said at least one processor to register the number of selections of the selected web pages in association with each piece of the location information of the web pages, and the determining code is further configured to cause at least one of said at least one processor to determine a presentation order of the location information of the web pages by giving a higher priority to the web pages whose number of selections is larger.

4. The information processing apparatus according to claim 3, wherein when a display time of the web page selected by a user is equal to or greater than a predetermined time, the registering code is further configured to cause at least one of said at least one processor to register the location information of the web page in association with the combination of at least one or more words.

5. The information processing apparatus according to claim 2,
wherein the registering code is further configured to cause at least one of said at least one processor to register selection time of the selected web pages or search time of the web pages in association with each piece of the location information of the web pages, and
the determining code is further configured to cause at least one of said at least one processor to calculate a time difference between an input time of the word and the selection time or the search time associated with the location information of the web pages, and determine the presentation order of the location information of the web pages by giving a higher priority to the web pages having a smaller time difference.

6. The information processing apparatus according to claim 5, wherein when a display time of the web page selected by a user is equal to or greater than a predetermined time, the registering code is further configured to cause at least one of said at least one processor to register the location information of the web page in association with the combination of at least one or more words.

7. The information processing apparatus according to claim 2,
wherein the registering code is further configured to cause at least one of said at least one processor to register selection time of the selected web pages or search time of the web pages in association with each piece of the location information of the web pages, and
the determining code is further configured to cause at least one of said at least one processor to determine the presentation order of the location information of the web pages by giving a higher priority to the location information of the web pages in which the selection time or the search time is included in the same time range as a time range in which an input time of the word is included, the time range being divided into a plurality of ranges.

8. The information processing apparatus according to claim 7, wherein when a display time of the web page selected by a user is equal to or greater than a predetermined time, the registering code is further configured to cause at least one of said at least one processor to register the location information of the web page in association with the combination of at least one or more words.

9. The information processing apparatus according to claim 2, wherein when a display time of the web page selected by a user is equal to or greater than a predetermined time, the registering code is further configured to cause at least one of said at least one processor to register the location information of the web page in association with the combination of at least one or more words.

10. The information processing apparatus according to claim 1, wherein:
said computer program code further comprises specifying code configured to cause at least one of said at least one processor to specify the location information of the web pages satisfying a predetermined condition among the location information of the web pages associated with the combination of at least one or more words, and
the controlling code is further configured to cause at least one of said at least one processor to present the location information of the web pages, which is specified in accordance with the specifying code, to be selectable in a presentation form according to the condition.

11. The information processing apparatus according to claim 10,
wherein the registering code is further configured to cause at least one of said at least one processor to register the number of selections of the selected web pages in association with each piece of the location information of the web pages, and
the specifying code is further configured to cause at least one of said at least one processor to specify a predetermined number as the location information of the web pages satisfying the condition by giving a higher priority to the location information of the web pages whose number of selections is larger.

12. The information processing apparatus according to claim 11, wherein when a display time of the web page selected by a user is equal to or greater than a predetermined time, the registering code is further configured to cause at least one of said at least one processor to register the location information of the web page in association with the combination of at least one or more words.

13. The information processing apparatus according to claim 10,
wherein the registering code is further configured to cause at least one of said at least one processor to register selection time of the selected web pages or search time of the web pages in association with each piece of the location information of the web pages, and
the specifying code is further configured to cause at least one of said at least one processor to calculate a time difference between an input time of the word and the selection time or the search time associated with each piece of the location information of the web pages, and specify a predetermined number as the location information of the web pages satisfying the condition by giving higher priority to the location information of the web page having a smaller time difference.

14. The information processing apparatus according to claim 13, wherein when a display time of the web page selected by a user is equal to or greater than a predetermined time, the registering code is further configured to cause at least one of said at least one processor to register the location information of the web page in association with the combination of at least one or more words.

15. The information processing apparatus according to claim 10,
wherein the registering code is further configured to cause at least one of said at least one processor to register selection time of the selected web pages or search time of the web pages in association with each piece of the location information of the web pages, and
the specifying code is further configured to cause at least one of said at least one processor to specify the location information of the web pages, in which the selection time or the search time is included in the same time range as a time range in which an input time of the word is included, the time range being divided into a plurality of ranges, as the location information of the web pages satisfying the condition.

16. The information processing apparatus according to claim 15, wherein when a display time of the web page selected by a user is equal to or greater than a predetermined time, the registering code is further configured to cause at least one of said at least one processor to register the location information of the web page in association with the combination of at least one or more words.

17. The information processing apparatus according to claim 10, wherein when a display time of the web page selected by a user is equal to or greater than a predetermined time, the registering code is further configured to cause at least one of said at least one processor to register the location information of the web page in association with the combination of at least one or more words.

18. The information processing apparatus according to claim 1, wherein when a display time of the web page selected by a user is equal to or greater than a predetermined time, the registering code is further configured to cause at least one of said at least one processor to register the location information of the web page in association with the combination of at least one or more words.

19. The information processing apparatus according to claim 1, wherein the registering code causes at least one of said at least one processor to register, in advance as a record in a database, the combination of the at least one or more word in association with the location information, and the controlling code causes the at least one processor to present the at least one piece of the location information by referring to the database only.

20. An information processing method, which is executed by a computer, the information processing method comprising:
    registering a combination of at least one or more words used for search of information provided on a network and location information indicating a location of a web page, which is selected by a user among a plurality of web pages including information searched by the combination of at least one or more words, on the network, in association with each other; and
    in response to receiving an input of at least part of a word, included in the combination of at least one or more words, and prior to executing search of information provided on the network using the word, presenting at least one piece of the location information that is previously registered in association with the combination of at least one or more words so that the at least one piece of the location information can be selected,
    wherein the plurality of web pages include the information searched by a search engine by using, as an input keyword, the combination of at least one or more word, in response to a search request, and
    the presenting the at least one piece of the location information comprises presenting the at least one piece of the location information without transmitting the search request to the search engine.

* * * * *